United States Patent Office 3,393,509
Patented July 23, 1968

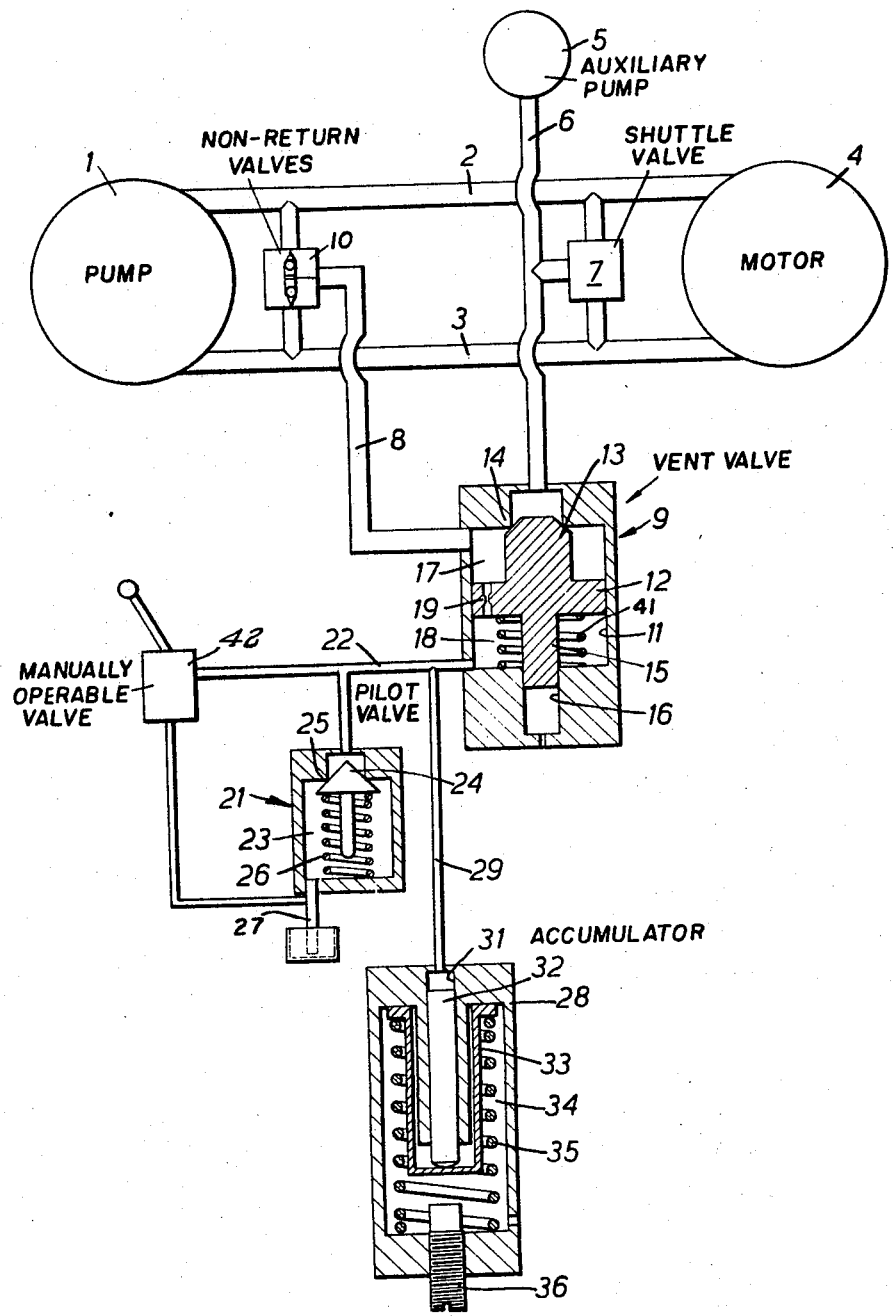

3,393,509
HYDRAULIC APPARATUS
Bertram C. Kempson, Cheltenham, England, assignor to Dowty Hydraulic Units Limited, Cheltenham, England, a British company
Filed Nov. 28, 1966, Ser. No. 597,472
Claims priority, application Great Britain, Dec. 16, 1965, 53,454/65
9 Claims. (Cl. 60—53)

ABSTRACT OF THE DISCLOSURE

This invention relates to a hydrostatic power transmission including control means whose function is to respond to rapid pressure rise within the transmission to open an unloading valve for the transmission before the pressure reaches the normal maximum safe pressure. The control apparatus comprises a vent valve operable to unload the transmission, a piston and cylinder or equivalent hydraulic device defining a first chamber and a second chamber, the displacement device acting on the vent valve in such a manner that pressure in the first chamber will tend to open the vent valve and pressure in the second chamber will tend to close the vent valve, an unrestricted connection between the first chamber and transmission pump delivery, a restricted connection between the second chamber and transmission pump delivery, a spring loaded pilot relief valve connected between the second chamber and a low pressure zone to vent the second chamber to low pressure when the pressure area exceeds a particular value, and a pressure liquid accumulator in connection with the second chamber. If the pressure rise within the hydrostatic transmission is slow, the rate of supply of pressure liquid to the second chamber will be capable of charging the accumulator and also of maintaining the second chamber substantially at the pressure of the first chamber. Thus the vent valve will not open until the relief valve has opened to limit pressure in the second chamber, and there is a further pressure rise in the transmission which can act in the first chamber to open the vent valve. In the event of a sudden pressure rise, there will be a substantial flow rate through the restrictor connection to charge the accumulator with the result that the pressure in the second chamber will be lower than the pressure in the first chamber, thus opening the vent valve before the transmission pressure reaches the maximum safe value.

---

This invention relates to hydraulic apparatus and more particularly to a hydrostatic power transmission comprising a hydraulic positive displacement pump in hydraulic connection with a hydraulic positive displacement motor. One or both of the pump and the motor may be of variable displacement. It is necessary in a hydrostatic transmission to limit the hydraulic pressure to a value which accords with the strength of the materials used to form the various parts of the transmission and it is not unusual to provide a pilot operated relief valve arranged to vent liquid from the transmission pump delivery when the pressure thereof tends to exced a predetermined maximum safe value. In some hydrostatic transmissions it is possible for the pressure to rise very quickly due either to the manner of use of the transmission or to particular structural features thereof and it is found that a pilot operated relief valve cannot respond sufficiently quickly to prevent pressure rising above the maximum safe value for a short period. Any rise of pressure above the maximum safe value can cause considerable damage in the transmission.

The object of the present invention is to provide means for use in a hydrostatic transmission having a pilot operated relief valve which will anticipate the occurrence of high transmission pressures and which will cause opening of the relief valve before the maximum safe value of pressure is reached in the case of rapid pressure rises.

In accordance with the present invention a hydrostatic power transmission includes a positive displacement pump in hydraulic connection with a positive displacement motor, a vent valve capable when open of venting pump delivery to low pressure, a hydraulic displacement device defining a first chamber and a second chamber the displacement device acting on the vent valve in such a manner that pressure in the first chamber will tend to open the vent valve and pressure in the second chamber will tend to close the vent valve, a comparatively unrestricted connection between the first chamber and pump delivery, a restricted connection between the second chamber and pump delivery, a spring loaded pilot relief valve connected between the second chamber and a low pressure zone to vent the second chamber to low pressure when the pressure therein exceeds a particular value, and a pressure liquid accumulator also in connection with the second chamber.

By this invention a slow rise in pump delivery pressure will be communicated equally to the first and second chambers and to the accumulator and the vent valve will be opened by the displacement device when the pressure in the second chamber, as controlled by the relief valve, cannot exert greater force on the vent valve than the pump pressure acting in the first chamber. However, when pump pressure rises rapidly the flow through the restricted connection to charge the accumulator allows the pressure in the first chamber to rise more rapidly than pressure in the second chamber and the vent valve will be opened by forces which result both from the rate of increase of pump pressure and from the pressure itself, thus ensuring that the vent valve will at least tend to open before the maximum safe pressure of the transmission is attained.

The term "displacement device" is intended to be broad in scope and to include any device having two chambers which when subjected to hydraulic pressure as described will control the vent valve in the manner described. For example a piston and cylinder unit or a flexible diaphragm device may be used. A substantial spring may be located in one of the chambers to act on the vent valve to provide a force which is independent of pressure, provided that under normal conditions when pump delivery pressure is below the maximum safe value there is a resultant force acting on the piston to close the vent valve.

The second chamber may also be connectible to the low pressure zone by a manually operable valve in order that the vent valve may also be under manual control.

A pair of hydraulic connections may be provided between the transmission pump and the motor to carry flow and return liquid between the pump and the motor. Further the pump may be of reversible displacement so that either pipe line may be the pump delivery. A pair of non-return valves may be connected to the pipe lines to select the pipe at higher pressure for connection to the first and second chambers.

For most effective operation of the invention the two chambers should be very little different in cross-sectional area.

How the invention may be carried into effect will now be particularly described with reference to the accompanying diagrammatic drawing.

In the drawing a variable positive displacement pump 1 is connected by a pair of pipe lines 2 and 3 to a fixed displacement hydraulic motor 4. In order to maintain the transmission primed with liquid during operation a small auxiliary pump 5 driven with the transmission pump 1 is arranged to pump liquid at low pressure from a reservoir and deliver it through a pipe 6 to a shuttle valve 7. The shuttle valve 7 is of conventional construction and is connected in between the pipe lines 2 and 3 to respond to the pressure difference between these pipe lines and to open a connection from the pipe 6 to the pipe 2 or 3 which is at the lower pressure. Normally such low pressure will be about 100 p.s.i. A pair of non-return valves formed in a valve unit 10 are also provided to connect between the pipe lines 2 and 3. The unit 10 responds to the pressure difference between the pipe lines 2 and 3 to connect pipe 8 to the pipe line at the higher pressure. This higher pressure may be as high as 4,000 p.s.i.

The pump 1 is a reversible positive displacement pump and depending on the direction of the selected displacement for the pump 1 either the pipe 2 or the pipe 3 can receive the delivery at pressure from the pump 1. Independently of whether the pump 1 is of reversible displacement it is possible for either of the pipe lines 2 and 3 to operate at the higher pressure. This can occur if the motor 4 drives a heavy inertia load. In this case when the motor drives the load one pipe line will be under pressure and when the motor is used to reduce the speed of the load the other pipe line will be under pressure. The structural material of the various parts of the transmission determine the maximum hydraulic pressure which the transmission can withstand and it is necessary during operation of the transmission that this maximum safe pressure should not be exceeded. If this pressure is substantially exceeded even for a very short period great damage may result in the transmission.

A pilot operated vent valve is normally provided whose function is to open a bypass connection between the pipe lines 2 and 3 immediately the pump delivery pressure approaches the maximum safe value. In the drawing the unit 9 is a pilot operated vent valve and the pipes 6 and 8 extend to it from the transmission. Within the valve 9 the displacement device comprises a cylinder 11 and a piston 12 mounted for sliding movement in the cylinder. From the one side of the piston 12 a vent valve closure member 13 extends to a circular seat 14 formed at one end of the cylinder 11. When the vent valve member engages its seat no further movement of the valve member onto the seat is possible and this particular kind of valve is known as a poppet valve. When the member 13 engages the seat 14 the vent valve is closed and no bypass flow can occur between the pipes 2 and 3. From the opposite side of the piston 12 a guide rod 15 is located in a bore 16 coaxial with the cylinder 11. On the side of the piston 12 on which the seat 14 is located the piston defines with the cylinder a first chamber 17 with which the pipe 8 is permanently connected. On the side of the piston 12 including the guide 15 the piston defines with the cylinder a second chamber 18. The effective diameter of the guide 15 is smaller than the effective diameter of the seat 14 and therefore the effective area of the piston 12 over which pressure may act in the first chamber 17 is slightly smaller than the effective area of the piston 12 over which pressure may act in the second chamber 18. A restrictor 19 is formed through the piston to interconnect the two chambers 18 and 17. The pipe 8 offers a substantially unrestricted connection from the delivery of the pump 1 into the chamber 17. The restrictor 19 forms a restricted connection from the delivery of pump 1 into the chamber 18. It will be appreciated that the restrictor 19 may equally be formed exteriorly of the cylinder 11 from the pipe 8 to the chamber 18.

A pilot valve 21 is connected by pipe 22 to the second chamber 18. The valve 21 includes a chamber 23 containing a valve member 24 urged onto a seat 25 by a spring 26. The pipe 22 is connected to the seat 25 and pressure from the pipe 22 will lift the valve 24 from its seat only when the pressure exceeds a particular value, which is determined by the loading of the spring 26. When valve 24 lifts from its seat flow of liquid may take place through the valve to a pipe 27 which connects back to a low pressure reservoir.

When the valve member 13 is on the point of lifting from its seat at the maximum safe pressure of the transmission, the hydraulic forces exerted on piston 12 due to pressures in the chambers 17 and 18 will be equal and this means that the pressure in the chamber 18 will be lower than the pressure in the chamber 17 by a proportional factor equal to the ratio between the effective areas of the piston 12 for the two chambers 17 and 18. For pump delivery pressure up to the value at which valve 24 lifts from its seat the pressure in the two chambers 17 and 18 will be equal and the valve member 13 will therefore always be urged onto its seat. At pressures between the lifting pressure of the valve 24 and the maximum safe pressure of the transmission, the pressure in the chamber 18 will remain substantially at the particular value determined by valve 24 whilst the pressure in chamber 17 rises to the maximum safe value. It is preferably arranged that at the maximum safe value the hydraulic force exerted on the piston 12 from the first chamber is very slightly greater than the hydraulic force exerted on the piston from the second chamber so that at the maximum safe pressure the valve 13 will start to open.

At the maximum safe pressure which will just lift the valve member 13 from its seat, the actual force available to move valve member 13 will be very small and the rate of movement of the valve member 13 from its seat will slow. If the rate of pressure rise within the transmission is high a condition can occur that transmission pressure will rise substantially above the maximum safe value before the valve member 13 can effectively move from its seat to open the bypass passage substantially. In accordance with the present invention the possibility of the maximum safe pressure being exceeded is reduced by the provision of an accumulator 28 connected by a pipe 29 to the chamber 18. Within the accumulator a small diameter cylinder 31 includes a plunger 32. The cylinder 31 is connected to the pipe 29. The opposite end of the plunger 32 which projects from the cylinder 31 engages a top hat washer 33 within the chamber 34. The top hat washer is urged by a compression spring 35 against one end of chamber 34 with a preloading such that transmission pressure acting in cylinder 31 on the plunger 32 will begin to move against the loading of spring 35 at a pressure slightly less than the particular pressure at which the valve 24 will lift from its seat. An adjustable stop 36 limits the movement of the plunger 32 to determine the volume of liquid which the accumulator 28 can absorb.

Assume that the transmission is in operation to drive the winding drum of a crane which is arranged to lift a heavy load from the ground. The pump 1 is driven by an electric motor or other convenient power source. As the winding drum is rotated by the motor the condition will arise that the lifting cable will suddenly become tight as it begins to lift the load from the ground. As the cable becomes tight the pressure in the transmission will rise at a very rapid rate. Up to the pressure at which plunger 32 begins to move, the increase in pressure will be communicated to both chambers 17 and 18 substantially equally in spite of the restrictor 19 and the valve member 13 will be held on its seat. When the plunger 32 starts to move against the spring 35 a small flow of liquid must pass through the restrictor 19 with the result that the pressure in the chamber 18 does not rise at the same rate as the pressure in chamber 17. For a short period therefore the hydraulic force acting in chamber 17 on the piston 12 can overcome the hydraulic force exerted on the piston in the chamber 18 to lift the valve member 13 from its seat and allow bypass flow. Such bypass flow will not allow unrestricted flow of liquid between the pipe lines 2 and 3 but the flow will be sufficient to reduce the rate of rise of pressure. Within a short period the flow of liquid to move the plunger 32 to engage the stop 36 will enable the liquid pressure in chamber 18 to rise to that in chamber 17, tending to close valve member 13 onto its seat. Assuming that the transmission pressure rise is still rapid the particular pressure will be attained at which valve 24 lifts from its seat which will then limit the pressure in chamber 18 from rising above this value. As the pressure in the transmission rises still further the force on the piston 12 due to pressure in the chamber 17 will rise and will lift the valve member 13 from its seat to open the bypass passage. The operations described take place in extremely quick succession during a sudden pressure rise in the transmission and the effect of the accumulator 28 is to provide an opening force on the valve member 13 which is generated in advance of the normal maximum safe pressure thereby helping to ensure when the maximum safe pressure occurs the valve member 13 will already be substantially lifted from its seat. For pressure changes in the transmission at a low rate the vent valve 9 and its pilot valve 21 will operate in the conventional manner and then valve 13 will lift from its seat as the maximum safe pressure is attained. Due to the slow rise in pressure the flow necessary through the restrictor 19 to fill the accumulator 28 will have negligible effect on the pressure in the chamber 18.

A spring 41 may be provided in one of the chambers and the effect of such a spring may be considered to be addition of effective area of the piston in the chamber in which it is located. If such a spring 41 is provided it would preferably be inserted in the chamber 18 and the actual area of the piston 12 exposed to the chamber 18 would then be somewhat less than the actual area of piston 12 exposed to the chamber 17. The loading of spring 41 would be calculated so that in the absence of the relief valve the valve member 13 will be held on its seat when the pressure reaches the maximum safe value. At the same time the loading of the spring 26 on the pilot valve must be so computed that at the maximum safe pressure in the transmission the force generated in the chamber 18 by the permitted pressure therein and the load of the spring 41 just equal the force exerted on the piston 12 by the pressure in chamber 17. With this modification the action of sudden pressure rise in the transmission will be as previously described to cause the valve member 13 to move from its seat for a lower pressure in pipe 8 than the maximum safe pressure.

It is within the scope of the present invention to substitute for the piston and cylinder what amounts to its mechanical equivalent. For example the piston can be replaced by a differential area diaphragm device.

The vent valve shown in the drawing is a poppet type of valve in which the valve member moves axially to engage its seat which then forms a stop preventing further movement of the valve member. It is equally possible within the invention to use a slide valve rather than a poppet valve as the vent valve. A slide valve is one in which a slidable valve member is capable of sliding over a port to effect a closing of the port. A piston valve is an example of a slide valve.

A manually operable valve 42 may be provided connected between chamber 18 and reservoir 27. The valve 42 is normally closed but is manually openable to unload the transmission, i.e., to provide a short circuit connection across the pump which will prevent it from generating substantial pressure. When open, the valve 42 will reduce pressure in chamber 18 to that in the reservoir and high pressure delivered by pump 1 will act through pipe 8 on piston 12 to open the vent valve and thus connect pump delivery to pipe 6 to unload the transmission.

I claim as my invention:

1. A hydrostatic power transmission including a positive displacement pump in hydraulic connection with a positive displacement motor, a vent valve capable when open of venting pump delivery to low pressure, a hydraulic displacement device defining a first chamber and a second chamber, the displacement device acting on the vent valve in such a manner that pressure in the first chamber will tend to open the vent valve and pressure in the second chamber will tend to close the vent valve, a comparatively unrestricted connection between the first chamber and pump delivery, a restricted connection between the second chamber and pump delivery, a spring loaded pilot relief valve connected between the second chamber and a low pressure zone to vent the second chamber to the low pressure zone when the pressure therein exceeds a particular value, and a pressure liquid accumulator also in connection with the second chamber.

2. A hydrostatic power transmission as claimed in claim 1 including a substantial spring located in one of the chambers to act on the vent valve to provide a force which is independent of pressure such that under normal conditions when pump delivery pressure is below the maximum safe value there is a resultant closing force on the vent valve.

3. A hydrostatic power transmission as claimed in claim 1 including a manually operable valve adapted to connect the second chamber to the low pressure zone as desired in order to unload the transmisions.

4. A hydrostatic power transmission as claimed in claim 2 including a manually operable valve adapted to connect the second chamber to the low pressure zone as desired in order to unload the transmission.

5. A hydrostatic power transmission as claimed in claim 1 including flow and return pipe lines extending between the transmission pump and the transmission motor and a pair of nonreturn valves connected to the flow and return pipe lines to select the pipe line at higher pressure for connection to the first and second chambers.

6. A hydrostatic power transmission as claimed in claim 1 wherein the hydraulic displacement device comprises a piston slidable in a cylinder.

7. A hydrostatic power transmission as claimed in claim 1 wherein the accumulator includes a preloaded spring arranged to ensure that the accumulator will not absorb liquid under pressure until the pressure is slightly below the particular pressure at which the relief valve begins to open.

8. A hydrostatic transmission as claimed in claim 7 including stop means to limit the capacity of the accumulator.

9. A hydrostatic power transmission as claimed in claim 7 in which the accumulator comprises a piston, a cylinder in which the cylinder is slidably mounted and a compression spring acting between the piston and the cylinder.

References Cited
UNITED STATES PATENTS

| | | | |
|---|---|---|---|
| 2,961,829 | 11/1960 | Weisenbach | 60—53 |
| 3,230,699 | 1/1966 | Hann et al. | 60—53 |

EDGAR W. GEOGHEGAN, *Primary Examiner.*